(12) United States Patent
Salotto (10) Patent No.: US 12,116,191 B2
(45) Date of Patent: *Oct. 15, 2024

(54) SYSTEMS AND METHODS FOR SECURING CORDS

(71) Applicant: Arnold G. Salotto, York, PA (US)

(72) Inventor: Arnold G. Salotto, York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,468

(22) Filed: Jul. 13, 2023

(65) Prior Publication Data

US 2023/0356902 A1 Nov. 9, 2023

Related U.S. Application Data

(63) Continuation of application No. 17/962,596, filed on Oct. 10, 2022, now Pat. No. 11,738,920, which is a continuation of application No. 17/190,854, filed on Mar. 3, 2021, now Pat. No. 11,465,818, which is a continuation of application No. 29/739,919, filed on
(Continued)

(51) Int. Cl.
*B65D 63/10* (2006.01)
*F16G 11/14* (2006.01)

(52) U.S. Cl.
CPC ........ *B65D 63/1018* (2013.01); *F16G 11/143* (2013.01); *B65D 63/109* (2013.01); *B65D 2563/107* (2013.01)

(58) Field of Classification Search
CPC ..... F16B 2/08; B65D 63/1018; B65D 63/109; B65D 2563/107; Y10T 24/314; Y10T 24/316; Y10T 24/39; F16G 11/143
See application file for complete search history.

(56) References Cited

U.S. PATENT DOCUMENTS

| 654,668 A | 7/1900 | Pergande |
| 1,616,215 A | 2/1927 | Chilson |

(Continued)

FOREIGN PATENT DOCUMENTS

| CA | 2029816 A1 | 5/1991 |
| CN | 206820390 U | 12/2017 |

(Continued)

OTHER PUBLICATIONS

Machine English translation of KR20170060650A, retrieved on Apr. 1, 2024, Clarivate Analytics. (Year: 2024), (8-pages).*

(Continued)

*Primary Examiner* — Robert Sandy
(74) *Attorney, Agent, or Firm* — Womble Bond Dickinson (US) LLP (57) ABSTRACT

An assembly for securing a cord in a selected compact configuration. The assembly can include a first attachment apparatus configured to connect to the cord. An elongate body can extend from the first attachment apparatus. The elongate body can be configured to be positioned to extend at least partially around the cord to at least partially secure the cord in the selected compact configuration. A second attachment apparatus can be positioned along at least a portion of the elongate body. The second attachment apparatus can be configured to connect to the first attachment apparatus to at least partially secure the elongate body at least partially about the cord in the selected compact configuration.

16 Claims, 7 Drawing Sheets

Related U.S. Application Data

Jun. 30, 2020, now Pat. No. Des. 1,036,971, and a continuation of application No. 29/726,402, filed on Mar. 3, 2020, now Pat. No. Des. 922,178, and a continuation of application No. 29/726,408, filed on Mar. 3, 2020, now Pat. No. Des. 952,446.

(60) Provisional application No. 62/984,358, filed on Mar. 3, 2020.

(56) References Cited

U.S. PATENT DOCUMENTS

| | | | |
|---|---|---|---|
| 3,174,787 | A | 3/1965 | Kolman |
| 3,590,442 | A | 7/1971 | Geisinger |
| 3,597,803 | A | 8/1971 | Van Neil |
| 3,953,911 | A | 5/1976 | Fishack |
| D272,518 | S | 2/1984 | Smith |
| 4,466,159 | A | 8/1984 | Burrage |
| 4,466,160 | A | 8/1984 | de Lima Castro Netto |
| 4,700,432 | A | 10/1987 | Fennell |
| 4,910,835 | A | 3/1990 | Carpenter |
| 4,991,265 | A | 2/1991 | Campbell et al. |
| D342,668 | S | 12/1993 | Rose |
| D369,538 | S | 5/1996 | Henslee |
| 5,515,580 | A | 5/1996 | McHenry, Jr. |
| D380,585 | S | 7/1997 | Olson |
| D382,379 | S | 8/1997 | Smith |
| 5,715,578 | A | 2/1998 | Knudson |
| 6,317,938 | B1 | 11/2001 | Durette |
| 6,401,305 | B1 | 6/2002 | Joseph |
| 6,523,229 | B2 | 2/2003 | Severson |
| 6,543,094 | B2 | 4/2003 | D'Addario |
| 6,634,063 | B2 | 10/2003 | Joseph |
| 6,681,451 | B1 | 1/2004 | Adams et al. |
| 6,807,715 | B1 | 10/2004 | Blair |
| 7,107,654 | B2 | 9/2006 | Byers |
| D530,600 | S | 10/2006 | Krisel |
| D570,256 | S | 6/2008 | Tucker |
| D613,586 | S | 4/2010 | Goodman |
| D630,088 | S | 1/2011 | Kim |
| D639,355 | S | 6/2011 | Kassel |
| D639,356 | S | 6/2011 | Kassel |
| D643,886 | S | 8/2011 | Kassel |
| D661,574 | S | 6/2012 | Platt |
| 8,191,207 | B1 | 6/2012 | Holscher |
| 8,209,820 | B1 | 7/2012 | Aparbal |
| 8,295,533 | B1 | 10/2012 | Schachtman |
| D714,044 | S | 9/2014 | Lee |
| D729,054 | S | 5/2015 | Chen |
| 9,021,681 | B2 | 5/2015 | Owen |
| 9,151,411 | B2 | 10/2015 | Owen |
| 9,340,341 | B2 | 5/2016 | Farrell |
| 9,382,051 | B2 | 7/2016 | Creato |
| 9,499,317 | B2 | 11/2016 | Comaniuk |
| D776,272 | S | 1/2017 | Backes |
| 9,537,268 | B2 | 1/2017 | Kellman |
| D796,944 | S | 9/2017 | Davis |
| 9,884,708 | B2 | 2/2018 | Cole et al. |
| D812,455 | S | 3/2018 | Samuelson |
| 9,927,057 | B2 | 3/2018 | Dyer et al. |
| 9,938,062 | B1 | 4/2018 | Scarlett |
| 10,029,835 | B1 | 7/2018 | Cuddy et al. |
| 10,065,777 | B2 | 9/2018 | King |
| 10,183,793 | B1 | 1/2019 | Scarlett |
| D847,617 | S | 5/2019 | Brooks |
| 10,364,076 | B2 | 7/2019 | Seok |
| 10,369,484 | B2 | 8/2019 | Barnas et al. |
| D861,087 | S | 9/2019 | Mantione, III |
| 10,435,214 | B2 | 10/2019 | Kuperus |
| 10,604,317 | B2 | 3/2020 | Chmelar |
| 10,806,277 | B1 | 10/2020 | Chargois |
| D911,826 | S | 3/2021 | Maynard |
| D919,417 | S | 5/2021 | Wedding |
| D922,178 | S | 6/2021 | Salotto |
| 11,019,883 | B2 | 6/2021 | Frydlewski |
| D952,446 | S | 5/2022 | Salotto |
| 11,465,818 | B2 | 10/2022 | Salotto |
| D974,880 | S | 1/2023 | He |
| D976,082 | S | 1/2023 | Salotto |
| 11,738,920 | B2 | 8/2023 | Salotto |
| D1,010,430 | S | 1/2024 | Brescianini |
| 2005/0257348 | A1 | 11/2005 | Byers |
| 2009/0277938 | A1 | 11/2009 | Baron |
| 2013/0014351 | A1 | 1/2013 | Kuglen |
| 2013/0185900 | A1 | 7/2013 | Campbell |
| 2015/0225150 | A1 | 8/2015 | Farrell |
| 2016/0156141 | A1 | 6/2016 | Kellman |
| 2016/0297584 | A1 | 10/2016 | Bicknell et al. |
| 2017/0066578 | A1 | 3/2017 | Kierstead |
| 2017/0190486 | A1 | 7/2017 | Martinson |

FOREIGN PATENT DOCUMENTS

| | | | | |
|---|---|---|---|---|
| EP | 1 291 565 | A2 | 3/2003 | |
| EP | 2 431 296 | A1 | 3/2012 | |
| JP | 2005-206226 | A | 8/2005 | |
| KR | 10-2010-0028304 | A | 3/2010 | |
| KR | 20-0463864 | Y1 | 11/2012 | |
| KR | 10-1540995 | B1 | 8/2015 | |
| KR | 20170060650 | A * | 6/2017 | ............ B65D 63/14 |
| WO | WO 2008/137660 | A1 | 11/2008 | |
| WO | WO 2015/183743 | A1 | 12/2015 | |
| WO | WO 2017/010629 | A1 * | 1/2017 | ............... F16B 2/08 |
| WO | WO 2018/009325 | A1 | 1/2018 | |
| WO | WO 2021/178552 | A1 | 9/2021 | |

OTHER PUBLICATIONS

Machine English translation of WO 2017010629-A1, retrieved on Apr. 1, 2024, Clarivate Analytics. (Year: 2024), (11 pages).*

Reusable Silicon Cable Twist Ties, TEEO Store, https://www.amazon.com/Reusable-Organizer-Management-Electronics-Non-Velcro/dp/B07Z8BB66S?th=1, Oct. 17, 2019 (Year: 2019).

Related to co-pending Design U.S. Appl. No. 29/726,402, filed Mar. 3, 2020, now U.S. Pat. No. D922,178, issued Jun. 15, 2021.

Related to co-pending Design U.S. Appl. No. 29/726,408, filed Mar. 3, 2020.

Related to co-pending Design U.S. Appl. No. 29/739,919, filed Jun. 30, 2020.

Related to co-pending Design U.S. Appl. No. 29/772,656, filed Mar. 3, 2021.

International Search Report and Written Opinion for PCT/US2021/020686 dated Jun. 28, 2021.

English machine translation of KR 20-0463864 Y1, retrieved from Espacenet on Feb. 25, 2022 (Year: 2022).

* cited by examiner

SYSTEMS AND METHODS FOR SECURING CORDS

CROSS-REFERENCE TO RELATED APPLICATION

This application is a continuation application of U.S. patent application Ser. No. 17/962,596, filed on Oct. 10, 2022, which is a continuation application of U.S. patent application Ser. No. 17/190,854, filed on Mar. 3, 2021, now U.S. Pat. No. 11,465,818, which claims the benefit of each of U.S. Provisional Patent Application No. 62/984,358, filed on Mar. 3, 2020, U.S. Design Pat. application No. 29/726,402, filed on Mar. 3, 2020, now U.S. Pat. No. D922,178, U.S. Design Pat. application No. 29/726,408, filed on Mar. 3, 2020, now U.S. Pat. No. D952,446, and U.S. Design Pat. application No. 29/739,919, filed on Jun. 30, 2020.

INCORPORATION BY REFERENCE

The disclosures of each of U.S. patent application Ser. No. 17/962,596, filed on Oct. 10, 2022, U.S. patent application Ser. No. 17/190,854, filed on Mar. 3, 2021, U.S. Provisional Patent Application No. 62/984,358, filed on Mar. 3, 2020, U.S. Design Pat. application No. 29/726,402, filed on Mar. 3, 2020, U.S. Design Pat. application No. 29/726,408, filed on Mar. 3, 2020, and U.S. Design Pat. application No. 29/739,919, filed on Jun. 30, 2020, are hereby incorporated by reference for all purposes as if set forth in their entirety.

TECHNICAL FIELD

The present disclosure relates to cord wraps, ties, etc. and in particular, to flexible, elastic cord wrapping or tying assemblies, systems, and methods for securing cords in compact configurations. Other aspects also are described.

SUMMARY

Briefly described, the present disclosure is directed to systems, assemblies, and methods for securing cords, such as head phone cords, charging cords for personal electronic devices (e.g., phones, tablets, laptops, etc.), extension cords, computer cords, or other suitable electric or non-electric cords, wires, cables, etc., in compact configurations. In one aspect, an assembly includes an elastic portion adapted to wrap around or otherwise be disposed/positioned about one or more cords. The elastic portion can be formed of a substantially flexible material that further can have a selected elasticity such that it can be stretched to extend/wrap around one or more cords, e.g., when the cord(s) is in a wrapped, folded or coiled configuration, and can contract or compress the one or more cords into a compact configuration. The assembly further includes attachment portions attached to the elastic portion at or substantially adjacent first and second end portions thereof. For example, the attachment portions generally include a first and a second attachment portion at or substantially adjacent respective first and second end portions of the elastic portion. The first and/or second attachment portions can be configured to be connectable to the cord for attaching or fixing the assembly thereto, and the first and second attachment portions further are connectable together to substantially secure the elastic portion around/about the cord in various compact configurations.

In general, one aspect of the disclosure is generally directed to an assembly for securing a cord in a selected compact configuration. The assembly can comprise a first attachment apparatus configured to connect to the cord. An elongate body can extend from the first attachment apparatus. The elongate body can be configured to be positioned to extend at least partially around the cord to at least partially secure the cord in the selected compact configuration. A second attachment apparatus can be positioned along at least a portion of the elongate body. The second attachment apparatus can be configured to connect to the first attachment apparatus to at least partially secure the elongate body at least partially about the cord in the selected compact configuration.

In another aspect, the disclosure is generally directed to a method comprising obtaining an assembly comprising a first attachment apparatus, an elastic portion extending from the first attachment apparatus, and a second attachment apparatus extending along at least a portion of the elastic portion. The method further can comprise connecting the first attachment apparatus to a portion of a cord, forming at least portion of the cord into a bundle, wrapping at least a portion of the elastic portion at least partially around the bundle, and connecting at least a portion of the second attachment apparatus to the first attachment apparatus to at least partially secure the bundle to the assembly.

Various objects, features, and advantages of the present disclosure will become apparent to those skilled in the art upon a review of the following detail description, when taken in conjunction with the accompanying drawings.

DRAWING DESCRIPTIONS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

Those skilled in the art will appreciate and understand that, according to common practice, the various features of the drawings discussed below are not necessarily drawn to scale, and that the dimensions of various features and elements of the drawings may be expanded or reduced to more clearly illustrate the embodiments of the present disclosure as described herein.

DETAILED DESCRIPTION

FIGS. 1-10 show systems or assemblies 100, 100', and 200 for securing one or more cords C or other elongated, flexible articles in various compact configurations. The cords C can include head phone cords, charging cords for personal electronic devices, such as phones, tablets, laptops, etc. (e.g., Lighting Cables, USB cords, etc.), extension cords, computer cords, computer accessory cords (e.g., for printers, keyboards, scanners etc.), television cords (e.g., HMDI cords, coaxial cables, etc.) or other suitable electric or non-electric cords, wires, cables, etc.

As FIGS. 1-10 indicate, these assemblies 100, 100', 200 generally include a tail or elastic portion 10 (broadly: an elongate body 10) configured to be wrapped around or positioned about a cord C, e.g., for securing the cord C (or cords C) in various compact configurations. The elastic portion 10 generally includes a substantially flexible material that has a selected elasticity such that the elastic portion 10 can be stretched or otherwise positioned around the cord C (or cords) to engage or press the cord C in various selected compact configurations. The various compact configurations can include different amounts, portions, etc. of the cord C (or cords) folded, coiled, wrapped, etc. The elastic portion 10 can be formed from elastic, flexible and/or stretchable materials, such as elastomers, natural rubbers, polyurethane, polybutadiene, neoprene, silicone, etc., though other suitable plastic, composite, synthetic, etc. materials can be used without departing from the scope of the present disclosure. The elastic portion 10 further has a first end portion 10A and a second end portion 10B.

The assemblies 100, 100', 200 further include attachment or connection apparatuses 12, 14 attached to the elastic portion 10 at, along, or substantially adjacent to the first and second end portions 10A, 10B as generally indicated in FIGS. 1-10. The attachment apparatuses 12, 14 can include a first attachment apparatus 12 and a second attachment apparatus 14. In some embodiments, portions of the first attachment apparatus 12 and/or the second attachment apparatus 14 can be formed from a rigid material, such as hard rubber, hard plastic, metals, wood, etc., or other suitable rigid plastic, composite, synthetic, etc. materials. The first and/or second attachment apparatuses 12, 14 can be configured to be connectable to the cord C for attaching or fixing the assembly 100, 100', 200 to the cord C. The material forming the elastic portion 10 can be a first material and the material forming the attachment apparatus 12 or 14 can be a second material. The first attachment apparatus 12 and the second attachment apparatus 14 further are connectable together to secure the elastic portion 10 about the cord C when the elastic portion 10 is wrapped or stretched around the cord C.

In use, when it is desired to place the cord C in a compact configuration, the cord C can be at least partially or substantially entirely wrapped, coiled or folded up into the desired compact configuration (e.g., a bundle B) and the elastic portion 10 can be stretched and positioned around the bundle B to hold or secure the cord C in its selected compact configuration. With the elastic portion 10 stretched about the cord C, the first attachment apparatus 12 and the second attachment apparatus 14 can be connected together to secure the elastic portion 10 thereabout (e.g., FIGS. 6 and 10). The elastic portion 10 further can be under tension and compress or engage the cord C in its wrapped configuration. The tension provided along the elastic portion 10 also can press or engage the first attachment apparatus 12 and the second attachment apparatus 14 against one another.

Figure 1:
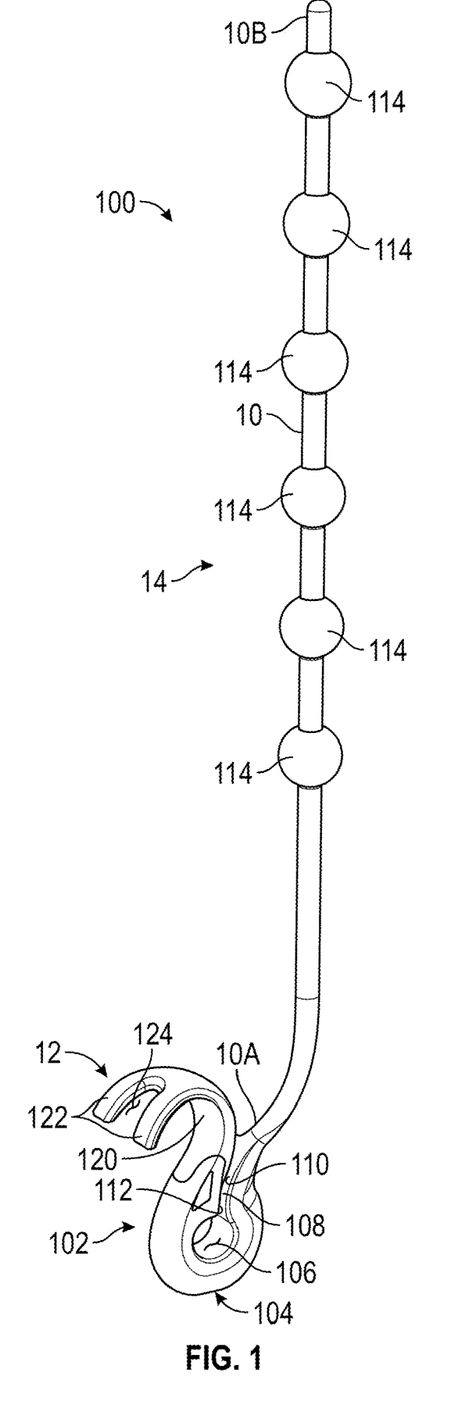
FIG. 1 is a perspective view of an assembly for securing one or more cords in compact configurations according to an exemplary embodiment of the present disclosure.
Figure 2:
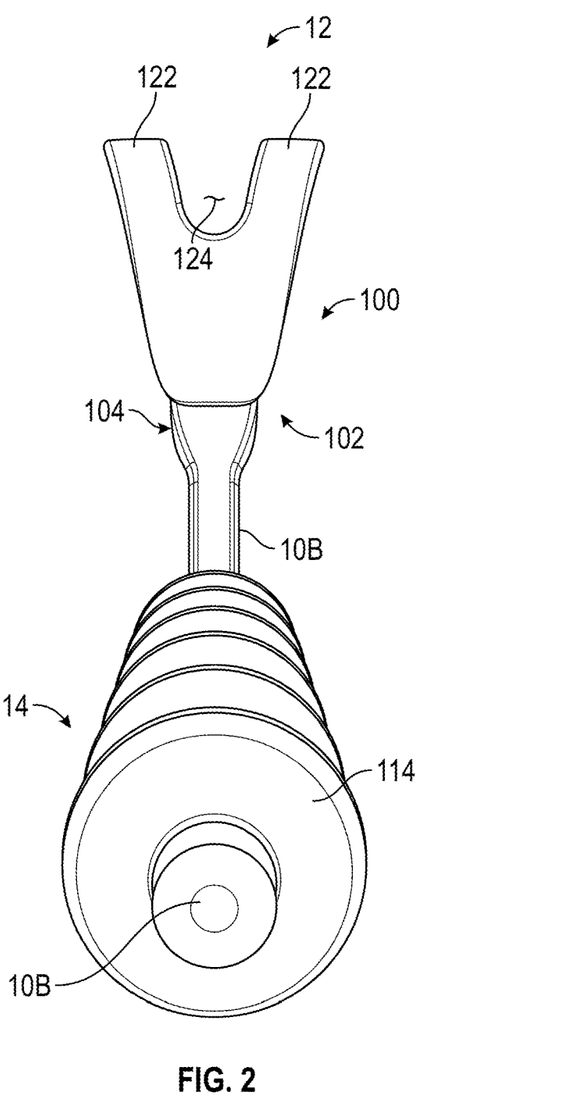
FIG. 2 is a top perspective view of the assembly of FIG. 1.
Figure 3:
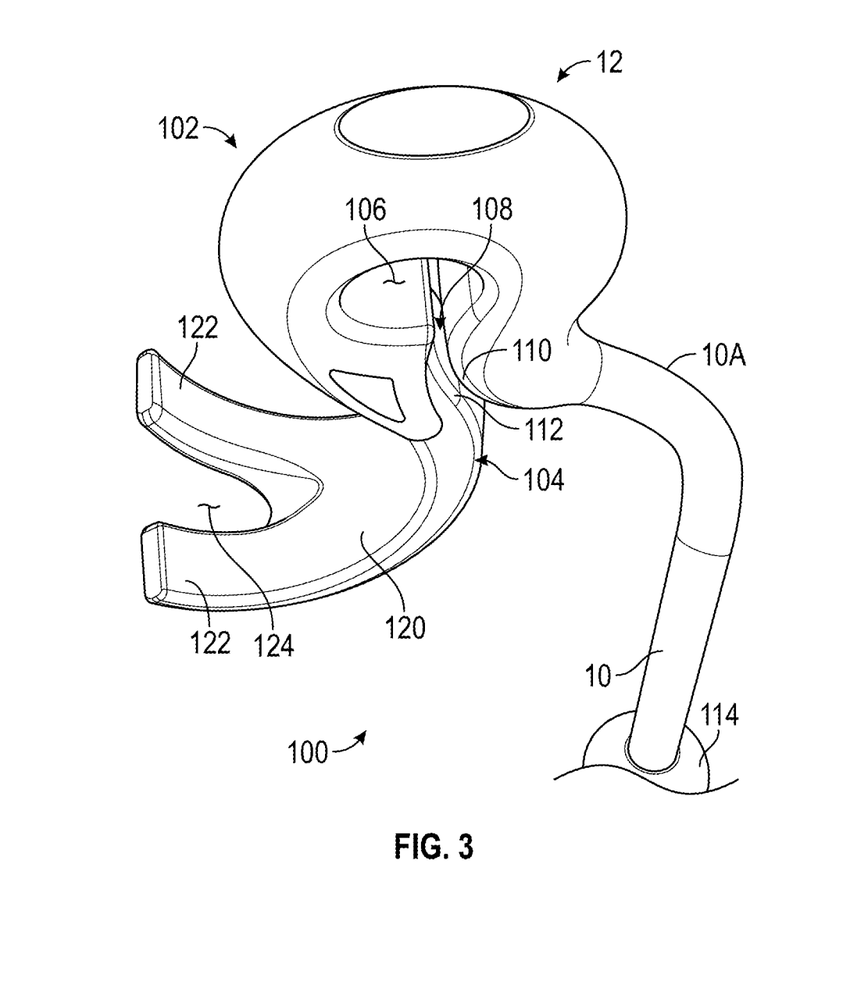
FIG. 3 is a bottom perspective view of the assembly of FIG. 1.
Figure 4:
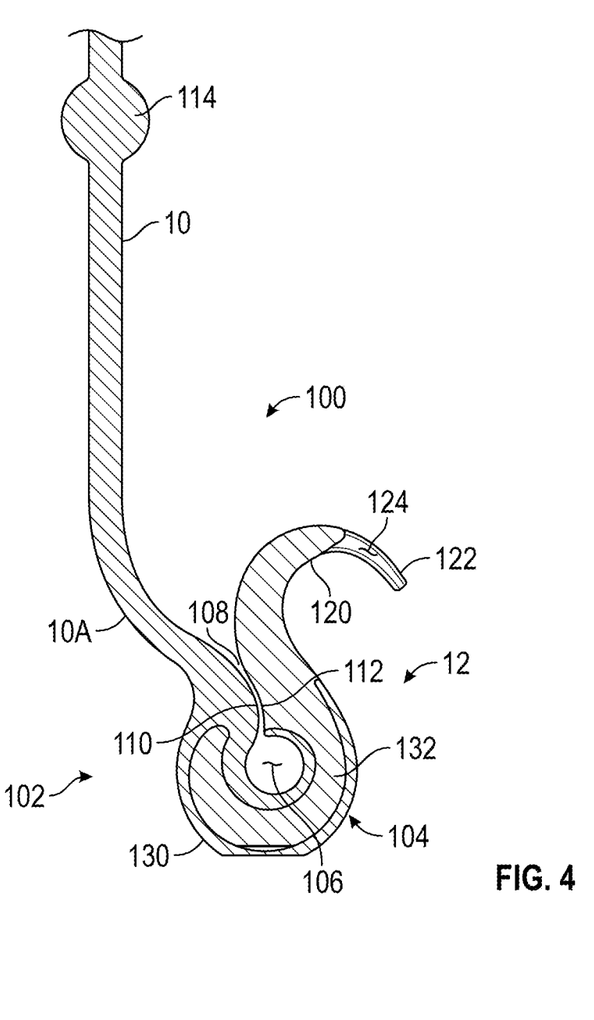
FIG. 4 is a schematic cross-sectional view of a portion of the assembly of FIG. 1.
Figure 5:
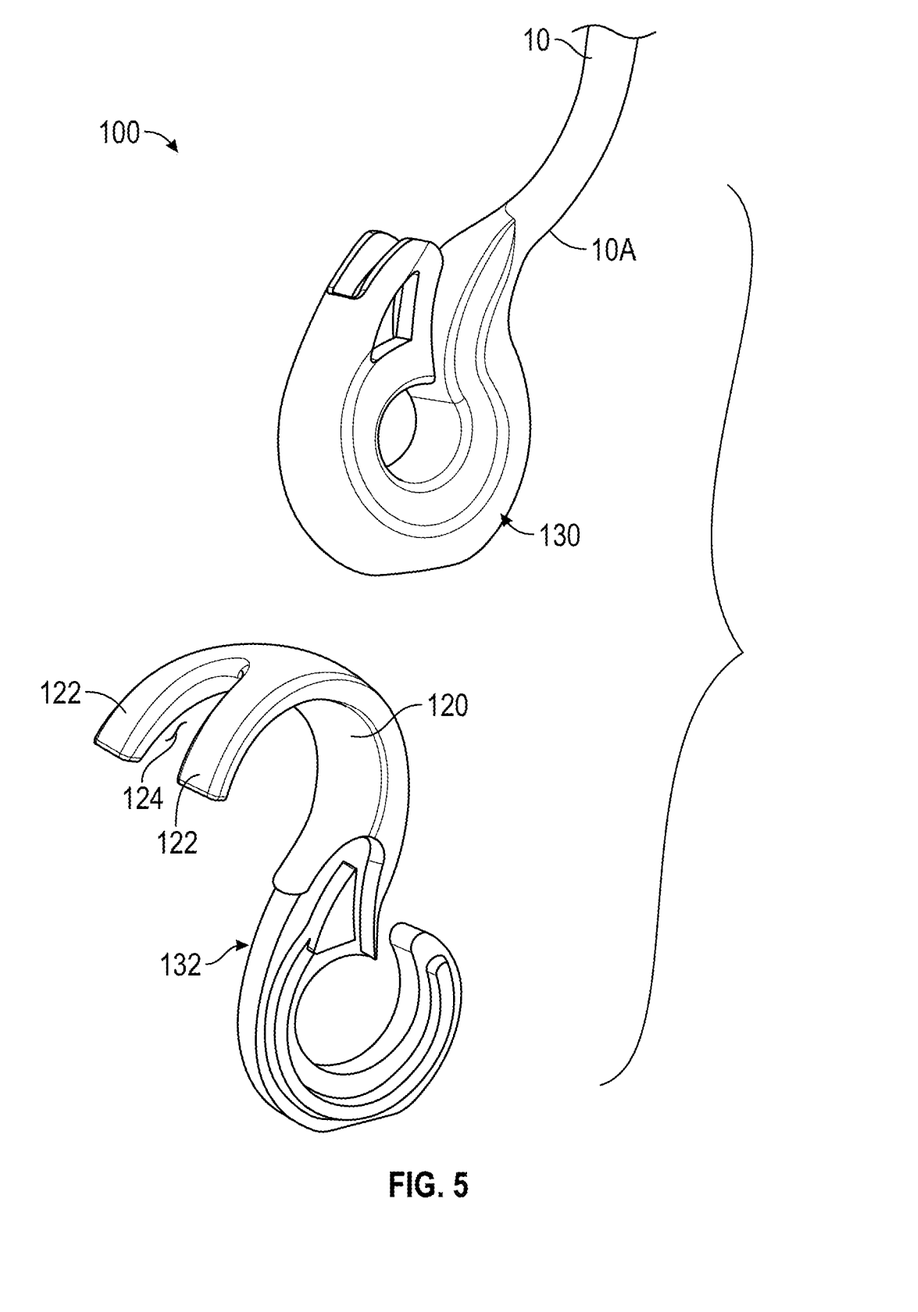
FIG. 5 is a schematic exploded perspective view of the assembly of FIG. 1.
Figure 6:
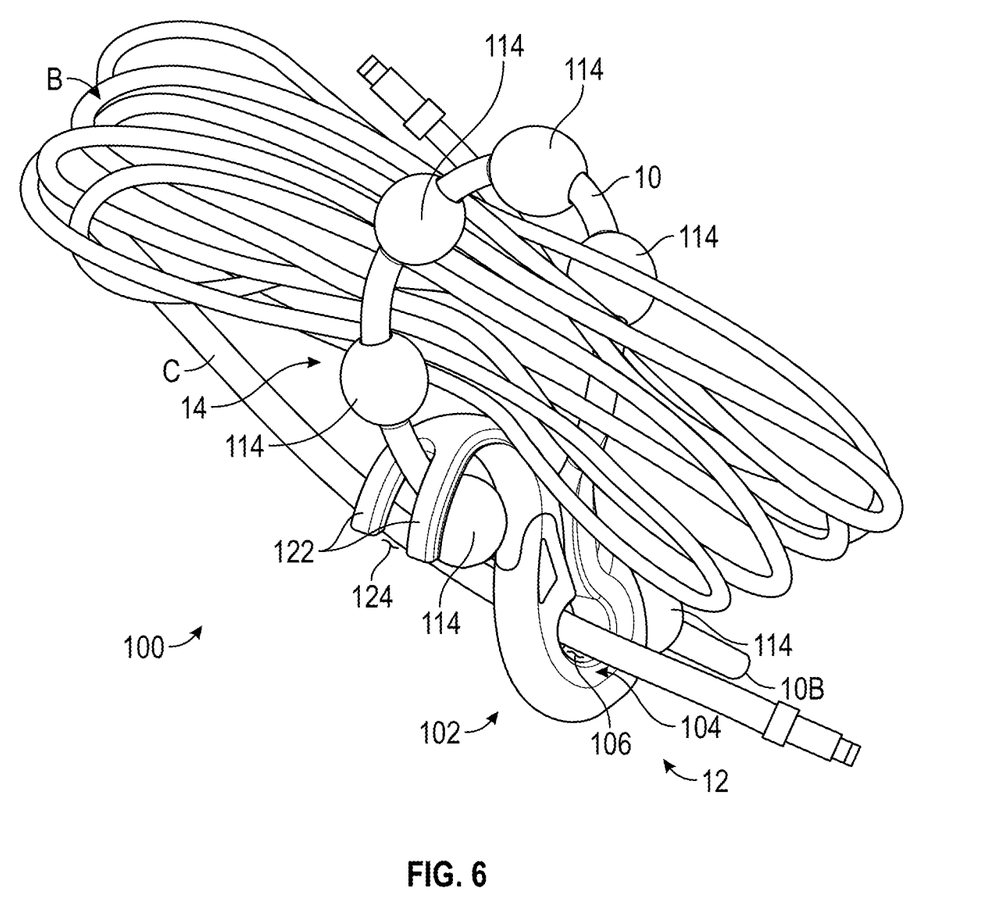
FIG. 6 is a perspective view of the assembly of FIG. 1 in engagement with a cord in a compact configuration according to the exemplary embodiment of the present disclosure.

FIGS. 1-6 show an assembly 100 for securing one or more cords C in selected compact configurations according to an exemplary embodiment. As shown in FIGS. 1-6, the first attachment apparatus 12 includes an enlarged portion or connector 102 extending from the first end portion 10A of the elastic portion 10. The connector 102 includes a connector body 104 at least partially extending around and defining a passage or channel 106 and a slot 108 that are configured to receive a portion of the cord C. This passage 106 is generally sized, dimensioned, and/or otherwise configured such that a portion of the cord C can be inserted therethrough to facilitate attachment/connection of the assembly 100 to the cord C, as generally indicated in FIG. 6. In the illustrated embodiment, the slot 108 can be in communication with the passage 106 and can be defined between a first wall 110 and a second wall 112 extending along respective portions of the connector body 104 (FIGS. 1, 3, and 4). In the illustrated embodiment, the assembly 100 can be attached to the cord C by moving (e.g., pressing) the portion of the cord C through the slot 108 to the passage 106 so that the portion of the cord C is engaged by the passage 106 (FIG. 6) (e.g., the cord C can be engaged to tightly enclose or secure the portion of the cord C) such that the assembly 100 is retained with the cord C, e.g., during the use thereof, i.e., charging, listening to music, etc.

In the embodiment shown in FIGS. 1-6, the second attachment apparatus 14 can include a plurality of bulbous portions 114 positioned in a spaced relation along a portion of the elastic portion 10 extending from the second end 10B. Each of the bulbous portions 114 can have a generally spherical shape or any suitable shape (e.g., disk-like shapes, semi-spherical shapes, oblong shapes, etc.). Further, as shown in FIGS. 1-6, the connector 102 can include a recessed portion 120 defined in the connector body 104 and shaped, sized, or otherwise configured to at least partially receive a selected one of the bulbous portions 114. For example, one of the bulbous portions 114 can be engaged against a surface or face of or defined along the recessed portion 120 to secure the elastic portion 10 about one or more cords C (FIG. 6).

In the illustrated embodiment, the connector body 104 further includes prongs 122 substantially adjacent or otherwise along the recessed portion 120. In an exemplary embodiment, the prongs 122 can form part of the recessed portion 120. The prongs 122 thus can define a pair of spaced apart surfaces that can be engaged by the bulbous portion 114. As shown in FIGS. 1-6, the surfaces of the recessed portion 120 and the prongs 122 can have a generally curved or arcuate shape, though other shapes are possible. The prongs 122 further define a slot or gap 124 configured to at least partially engage or contact a portion of the elastic portion 10 to help secure and retain the bulbous portion 114 within or along the recessed portion 120. For example, the prongs 122 can frictionally engage or contact opposing sides of at least a portion of the elastic portion 10 to secure the bulbous portion 114 within or along the recessed portion 120. In the illustrated embodiment, the bulbous portions 114 can be selectively engaged with the recessed portion 120 to allow for selective tightening of the elastic portion 10 about one or more cords C, e.g., to accommodate cords of different sizes and/or various selected/desired folded, coiled, wrapped configurations. In embodiments, the recessed portion can have a different configuration, for example, including one or more notches formed on the connector body. The elastic portion 10, the first attachment apparatus 12 (including the connector 102, the connector body 104, the passage 106, the slot 108, the walls 110, 112, the recessed portion 120, the prongs 122, and/or the gap 124), and/or the second attachment apparatus (including any or all of the bulbous portions 114) could be otherwise shaped, sized, positioned, and/or configured without departing from the disclosure In the illustrated embodiment, the elastic portion 10 and the bulbous portions 114 can be formed from a first material that is flexible and/or stretchable, such as elastomers, rubber, polyurethane, polybutadiene, neoprene, silicone, etc., though other suitable plastic, composite, synthetic, etc. materials can be used without departing from the scope of the present disclosure. In some embodiments, the bulbous portions 114 can be formed with the remainder of the elastic portion (e.g., can be integral with and/or continuous with the elastic portion 10). In other embodiments, the bulbous portions 114 can be separately formed of the same material or a different material and can be mounted to (e.g., adhered to, welded to, fused to, etc.) the remainder of the elastic portion 10. As shown in FIGS. 4 and 5, the connector 102 can have a first portion 130 and a second portion 132 that cooperate to at least partially form the connector body 104. The first portion 130 can be an extension of the elastic portion 10 (e.g., can be integrally formed with the elastic portion 10). The second portion 132 can be formed from a second material that is more rigid than the first material. For example, the second material can include hard rubber, hard plastic, metallic materials, wood, etc., or other suitable hard plastic, composite, synthetic, etc. materials or combinations thereof. In some embodiments, the second portion 132 can be over-molded with a softer and/or more resilient material, such as elastomers, rubber, polyurethane, polybutadiene, neoprene, silicone, etc. and/or other suitable plastic, composite, synthetic, etc. materials. As shown in FIG. 5, the second portion 132 includes the recessed portion 120 and the prongs 122, and the relative rigidity of the second portion 132 allows a selected one of the bulbous portions 114 to be secured within or along the recessed portion 120 (e.g., under urging or tension of the elastic portion 10) and allows the elastic portion 10 to be inserted and secured in the gap 124. As shown in FIG. 4, a portion of the second portion 132 can be received in an opening in the first portion 130 to form the connector body 104. In one embodiment, the first portion 130 and the second portion 132 can be adhered or otherwise secured together.

In use, the assembly 100 can be connected to a portion of the cord C (e.g., an end portion) by positioning the portion of the cord C between the first end 10A of the elastic portion 10 and a convex curved portion of the connector body 104 and pressing the portion of the cord C through the slot 108 to the passage 106. In one embodiment, the walls 110, 112 of the connector body 104 can be curved to help guide the cord portion into the slot 108. In an exemplary embodiment, at least a portion of the connector body 104 can compress and/or deform as the cord C moves through the slot 108 (e.g., the elastic material can compress and/or deform and/or the second portion 132 can bend) and can return or rebound to its original configuration once the cord C exits the slot 108 to be is positioned in the passage 106 to help retain the cord C in the passage 106. Accordingly, the cord C can be pushed into the connector 102 to quickly and easily attach the assembly 100 and the cord C. The cord C further can be engaged or pulled by a user and moved through the slot 108 to move apart the side portions 110 and 112 to facilitate quick and easy removal or release of the cord C and the assembly 100.

When it is desired to secure the cord C in a selected compact configuration, the cord C can be at least partially or substantially entirely wrapped, coiled, and/or folded to form a bundle B of the cord C (FIG. 6), and the elastic portion 10 can be stretched and/or looped around the bundle B, e.g., in the selected compact configuration of the cord C (FIG. 6). Thereafter, as indicated in FIG. 6, a portion of the elastic portion 10 can be inserted through the gap 124 of the prongs 122 such that a selected one of the bulbous portions 114 is positioned proximate the prongs 122 and the recessed portion 120 (e.g., adjacent the concave portion of the connector body 104 defining the recessed portion). When the elastic portion 10 is released, the tension in the elongated elastic portion 10 compresses or secures the cord in its selected compact configuration and further engages or presses the selected bulbous portion 114 against the recessed portion 120 of the connector 102, such that the elastic portion 10 is securely engaged, compressed, and/or tightly wrapped about the cord C to secure it in the selected compact configuration. That is, in an embodiment, the tension on the elastic portion 10 compresses and secures the cord in its selected compact configuration and further presses the selected bulbous portion 114 of the second attachment apparatus 14 against the connector 102 of the first attachment apparatus 12 to facilitate a substantially secure connection therebetween. In this regard, a first portion of the cord C is engaged with/attached to the first attachment apparatus 12 and a second portion of the cord C is engaged with/attached to the second attachment apparatus 14.

In an exemplary embodiment, the bulbous portion 114 can be selected so that the elastic portion 10 can be stretched when the elastic portion is wrapped over the bundle of the cord C and the selected bulbous portion 114 is engaged with the recessed portion 120 and the resulting tension in the elastic portion 10 can help retain the selected bulbous portion 114 against the surface of the recessed portion 120. For example, for a larger cord C and cord bundle B, the selected bulbous portion 114 can be closer to the end 10B of the elastic portion 10, and for a smaller bundle B, one can select a bulbous portion 114 that is closer to the end 10A of the elastic portion 10.

Figure 7:
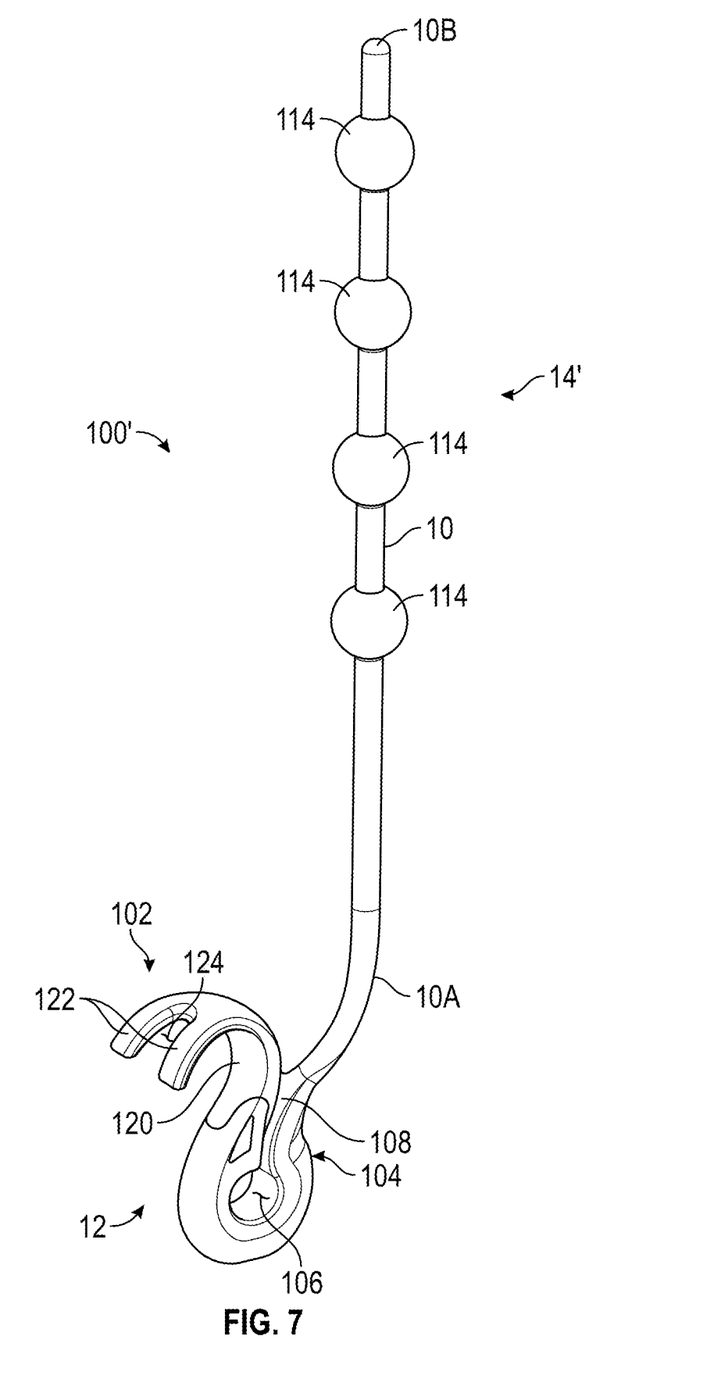
FIG. 7 is a perspective view of an assembly for securing one or more cords in compact configurations according to an alternative exemplary embodiment of the present disclosure.

While the attachment apparatus 14 includes six (6) bulbous portions 114 as shown in FIGS. 1, 2, and 6, any suitable number of bulbous portions 114 could be included (e.g., 1 or more bulbous portions). For example, an alternative assembly 100' is shown in FIG. 7. In the illustrated embodiment, the alternative assembly 100' can have an attachment apparatus 14' with four (4) bulbous portions 114.

Figure 8:
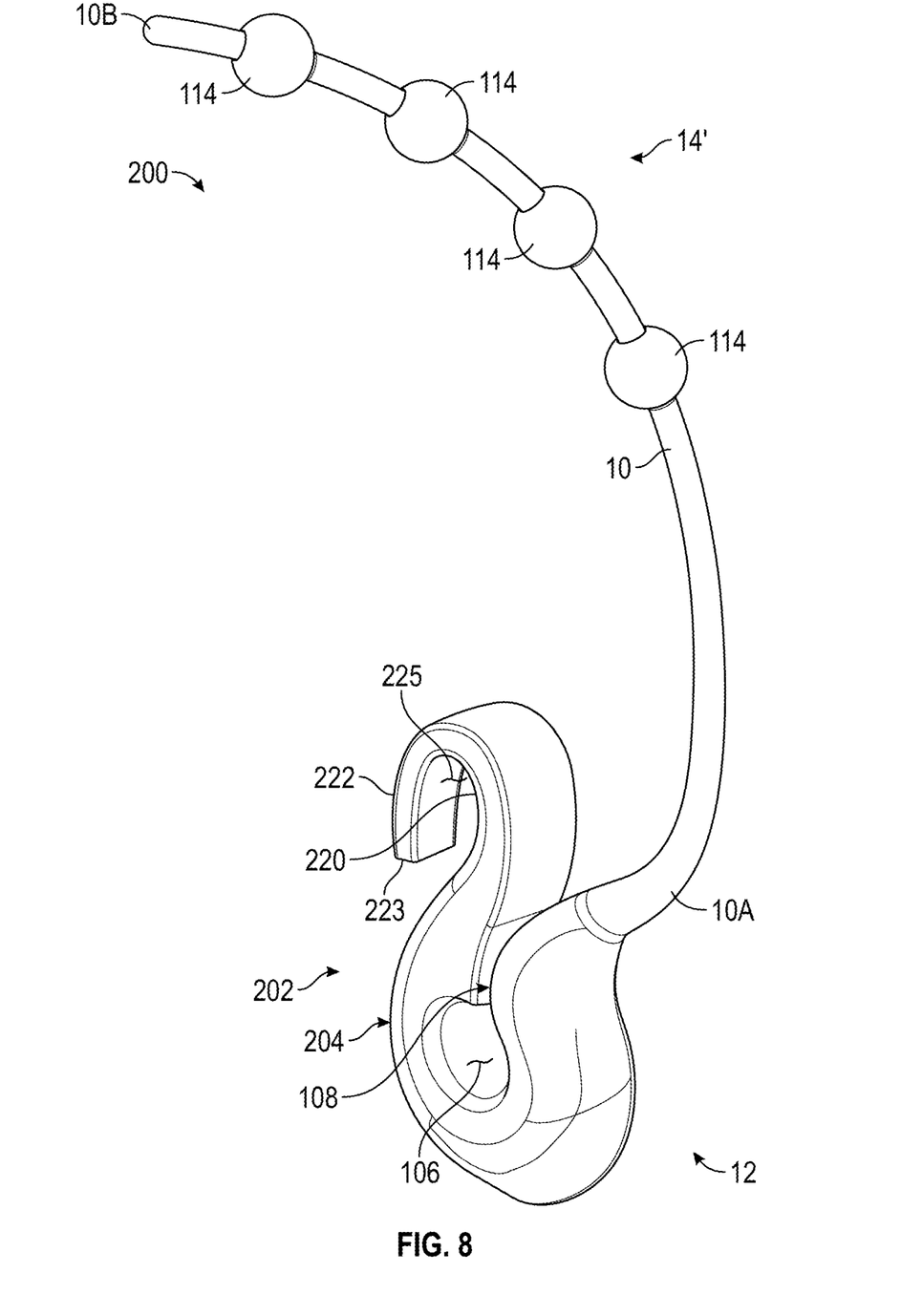
FIG. 8 is a perspective view of an assembly for securing one or more cords in compact configurations according to another alternative exemplary embodiment of the present disclosure.

FIG. 8 shows an assembly 200 for securing one or more cords C in selected compact configurations according to another embodiment, wherein the first attachment apparatus 12 includes a connector 202 at or substantially adjacent the first end 10A of the elastic portion 10. In the illustrated embodiment, the connector 202 includes a connector body 204 having a hook shape 222 that is curved to define the recessed portion 220 (e.g., a concave curved portion) configured to receive a portion of the elastic portion 10. In one embodiment, a distal end 223 of the hook shape 222 is spaced apart from a remainder of the connector body 204 by a distance, which can be sized so that the elastic portion 10 can slide or snap between the distal end 223 and the remainder of the connector body 204 into a receiving space 225 at least partially defined by the recessed portion 220 and/or the hook shape 222. In the illustrated embodiment, the width of the space 225 under the recessed portion 220 can be smaller than the size of the bulbous portions 114 so that the bulbous portions 114 cannot be easily pulled through the space 225 under the recessed portion 220 when the elastic portion 10 is engaged under the recessed portion 220.

Figure 9:
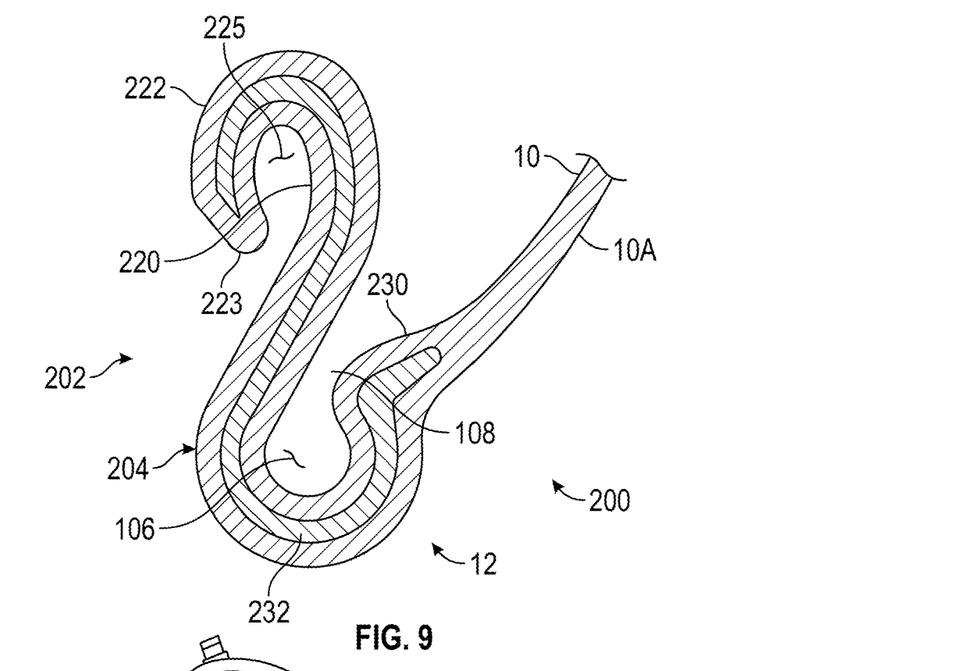
FIG. 9 is a schematic cross-sectional view of a portion of the assembly of FIG. 8.
Figure 10:
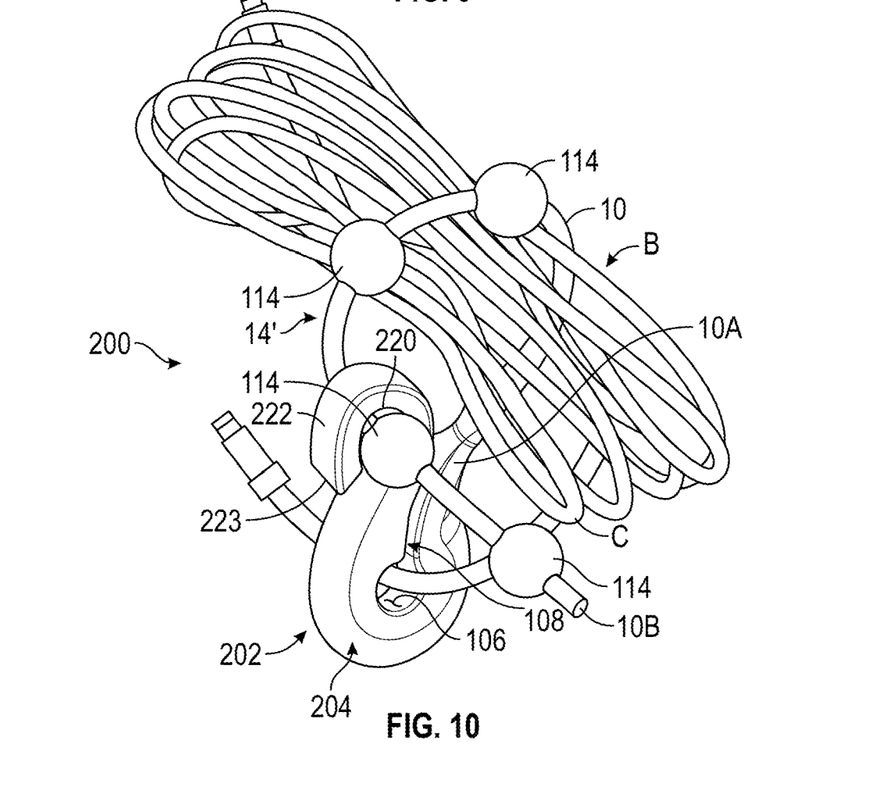
FIG. 10 is a perspective view of the assembly of FIG. 8 in engagement with a cord in a compact configuration according to the exemplary embodiment of the present disclosure.

As shown in the schematic cross-section of FIG. 9, the connector body 204 can include an outer portion 230, which can be continuous with the elastic portion 10, and an inner portion 232, which can be a metal strip that is bent into the shape of the connector body 204. In one embodiment, the outer portion 230 can be over-molded on the inner portion 232. The connector body 204 could be otherwise configured without departing from the disclosure. For example, the inner portion 232 could include hard rubber, hard plastic, metallic materials, wood, etc., or other suitable hard plastic, composite, synthetic, etc. materials or combinations thereof.

In use, an end or another portion of the cord C can be engaged with the passage 106, the remainder of the cord C can be formed into a bundle B, and the elastic portion 10 can be at least partially wrapped around the bundle B similarly to the process described above with respect to the assembly 100 shown in FIGS. 1-6. The attachment apparatus 14' can be engaged with the hook shape 222 by pulling (e.g., stretching) the elastic portion 10 around the bundle B of the cord C and inserting a portion of the elastic portion 10 past the distal end 223 of the hook shape 222 and into the space 225. In one embodiment, the tension in the elastic portion 10 can pull an adjacent one of the bulbous portions 114 against a side of the hook shape 222 so that the attachment apparatus 14' is retained in engagement with the hook shape 222 and the elastic portion 10 retains the cord bundle B in engagement with the assembly 200. In this regard, a first portion of the cord C is engaged with/attached to the first attachment apparatus 12 and a second portion of the cord C is engaged with/attached to the second attachment apparatus 14.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. It therefore will be understood by those skilled in the art that while the present invention has been described above with reference to preferred embodiments, numerous variations, modifications, and additions can be made thereto without departing from the spirit and scope of the present invention as set forth in the following claims. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

The invention claimed is:

1. An assembly for securing a cord in a selected compact configuration, the assembly comprising:
    a first attachment apparatus comprising a connector body and configured to connect to the cord, the connector body having an at least partially curved configuration to define a recessed portion therealong, the connector body further defining at least a pair of spaced apart surfaces such that a gap is positioned therebetween;
    an elongate body extending from the first attachment apparatus, the elongate body being configured to be positioned extending at least partially around the cord to at least partially secure the cord in the selected compact configuration, the elongate body comprises a material selected from the group consisting of polyurethane, polybutadiene, neoprene, and silicone; and
    a second attachment apparatus positioned along at least a portion of the elongate body, the second attachment apparatus being configured to connect to the first attachment apparatus to at least partially secure the elongate body at least partially about the cord in the selected compact configuration,
    the connector body is configured such that the recessed portion is for at least partially receiving a portion of the second attachment apparatus and such that the gap is for at least partially receiving a portion of the elongate body.

2. The assembly of claim 1, wherein the second attachment apparatus comprises a plurality of bulbous portions spaced along the elongate body, and wherein the connector body is configured such that the recessed portion is for at least partially receiving a respective bulbous portion of the plurality of bulbous portions.

3. The assembly of claim 2, wherein the at least a pair of spaced apart surfaces are at least partially defined along an outer edge of the connector body for at least partially receiving a portion of the elongate body extending away from a respective bulbous portion.

4. The assembly of claim 3, wherein the connector body at least partially defines a passage, the passage is configured for receiving a portion of the cord.

5. The assembly of claim 1, wherein the material associated with the elongate body is a first material, and the connector body comprises a second material selected from the group consisting of hard rubber, hard plastic, metallic materials, and wood.

6. An assembly for securing a cord in a selected compact configuration, the assembly comprising:
    a first attachment apparatus comprising a connector body and configured to connect to the cord;
    an elongate body extending from the first attachment apparatus, the elongate body being configured to be positioned to extend at least partially around the cord to at least partially secure the cord in the selected compact configuration, the connector body comprises a more rigid material relative to a material comprised by the elongate body; and
    a second attachment apparatus positioned along at least a portion of the elongate body, the second attachment apparatus being configured to connect to the first attachment apparatus to at least partially secure the elongate body at least partially about the cord in the selected compact configuration.

7. The assembly of claim 6, wherein the connector body at least partially defines a recessed portion configured for receiving at least a portion of at least one of the second attachment apparatus and the elongate body for connecting the elongate body to the first attachment apparatus.

8. The assembly of claim 7, wherein the connector body at least partially defines a passage, the passage being configured for receiving a portion of the cord.

9. The assembly of claim 8, wherein the connector body further defines at least a pair of spaced apart surfaces for at least partially receiving a portion of the elongate body.

10. The assembly of claim 6, wherein the elongate body comprises a first material selected from the group consisting of polyurethane, polybutadiene, neoprene, and silicone.

11. The assembly of claim 10, wherein the connector body comprises a second material selected from the group consisting of hard rubber, hard plastic, metallic materials, and wood.

12. A method comprising:
obtaining a connector assembly, the connector assembly comprising a first attachment apparatus comprising a connector body, the connector body having an at least partially curved configuration to define a recessed portion therealong, the connector body further defining at least a pair of spaced apart surfaces such that a gap is positioned therebetween, an elongate body extending from the first attachment apparatus, and a second attachment apparatus positioned along at least a portion of the elongate body, the elongate body comprises a material selected from the group consisting of polyurethane, polybutadiene, neoprene, and silicon;
forming at least a portion of a cord into a bundle;
wrapping at least a portion of the elongate body at least partially around the bundle;
positioning at least a portion of the second attachment apparatus in the recessed portion; and
positioning at least portion of the elongate body in the gap.

13. The method of claim 12, wherein the second attachment apparatus comprises a plurality of bulbous portions spaced along the elongate body, and positioning at least a portion of the second attachment apparatus comprises positioning at least a portion of a respective bulbous portion of the plurality of bulbous portions in the recessed portion of the connector body.

14. The method of claim 13, wherein the at least a pair of spaced apart surfaces are at least partially defined along an outer edge of the connector body, and the method comprises positioning at least a portion of the elongate body in the gap.

15. The method of claim 14, wherein the connector body at least partially defines a passage, and the method further comprises positioning at least a portion of the cord in the passage.

16. The method of claim 12, wherein the material associated with the elongate body is a first material, and the connector body comprises a second material selected from the group consisting of hard rubber, hard plastic, metallic materials, and wood.

* * * * *